(12) United States Patent
Tongu et al.

(10) Patent No.: US 7,073,341 B2
(45) Date of Patent: Jul. 11, 2006

(54) AIR CONDITIONER

(75) Inventors: Shinji Tongu, Hamamatsu (JP); Tomiyuki Matsukiyo, Hamamatsu (JP); Kazuhei Arita, Hamamatsu (JP); Yoshihiro Ichino, Hamamatsu (JP); Masato Ogai, Hamamatsu (JP); Akira Yamauchi, Hamamatsu (JP); Takayuki Yamazaki, Hamamatsu (JP)

(73) Assignee: Yazaki Corporation, Tokyo (JP)

( * ) Notice: Subject to any disclaimer, the term of this patent is extended or adjusted under 35 U.S.C. 154(b) by 381 days.

(21) Appl. No.: 10/473,046

(22) PCT Filed: Mar. 26, 2002

(86) PCT No.: PCT/JP02/02924

§ 371 (c)(1),
(2), (4) Date: Sep. 26, 2003

(87) PCT Pub. No.: WO02/086397

PCT Pub. Date: Oct. 31, 2002

(65) Prior Publication Data

US 2005/0262869 A1    Dec. 1, 2005

(30) Foreign Application Priority Data

Mar. 26, 2001   (JP) ............................ 2001-088514

(51) Int. Cl.
*F25D 17/02* (2006.01)
(52) U.S. Cl. .................. 62/185; 62/238.3; 62/476
(58) Field of Classification Search .................. 62/185, 62/148, 141, 238.3, 476, 323.2, 489, 430
See application file for complete search history.

(56) References Cited

U.S. PATENT DOCUMENTS

| 4,083,398 | A | * | 4/1978 | Fallon et al. ................. 165/66 |
| 4,164,128 | A | | 8/1979 | Newton |
| 4,180,128 | A | * | 12/1979 | Fallon et al. ................. 165/76 |
| 4,429,541 | A | | 2/1984 | Kamejima et al. |
| 4,523,631 | A | | 6/1985 | McKiney |
| 4,589,262 | A | | 5/1986 | Nagao |
| 5,231,849 | A | * | 8/1993 | Rosenblatt ................. 62/238.3 |
| 5,259,205 | A | * | 11/1993 | Takahata et al. ............. 62/476 |

(Continued)

FOREIGN PATENT DOCUMENTS

DE    2728398 A1 *  1/1979

(Continued)

OTHER PUBLICATIONS

Patent Abstracts of Japan vol. 1995, No. 06, Jul. 31, 1995.

(Continued)

*Primary Examiner*—Mohammad M. Ali
(74) *Attorney, Agent, or Firm*—Sughrue Mion, PLLC

(57) ABSTRACT

An air conditioner is provided that includes an exhaust heat recovery unit for recovering exhaust heat in a heat transfer medium, a heat transfer medium passage in which the heat transfer medium outputted from the exhaust heat recovery unit flows, an auxiliary heating device, heats the heat transfer medium, an absorption chiller driven by heat of the heat transfer medium, a refrigerant passage, through which a refrigerant outputted from the absorption chiller flows, an indoor unit to which the refrigerant is supplied through the refrigerant passage, a heat transfer medium temperature detector for detecting the temperature of the heat transfer medium flowing through the heat transfer medium passage, a refrigerant temperature detector for detecting the temperature of the refrigerant flowing through the refrigerant passage, and a control portion for controlling an operation of driving the auxiliary heating device.

5 Claims, 6 Drawing Sheets

U.S. PATENT DOCUMENTS

| | | | |
|---|---|---|---|
| 5,289,868 A | | 3/1994 | Koseki et al. |
| 5,363,668 A | | 11/1994 | Nakao et al. |
| 5,592,825 A | * | 1/1997 | Inoue .......................... 62/141 |
| 5,619,859 A | | 4/1997 | Takigawa et al. |
| 5,660,799 A | * | 8/1997 | Motai et al. ................ 422/112 |
| 5,730,356 A | * | 3/1998 | Mongan ...................... 237/19 |
| 5,732,569 A | * | 3/1998 | Sanada et al. ................ 62/481 |
| 5,878,675 A | * | 3/1999 | Iijima et al. ................ 110/215 |
| 5,901,567 A | * | 5/1999 | Suzuki et al. ............... 62/324.2 |
| 6,145,338 A | * | 11/2000 | Nakamura et al. ............ 62/497 |
| 6,477,850 B1 | | 11/2002 | Arita et al. |
| 6,511,636 B1 | * | 1/2003 | Shimizu et al. ............. 422/169 |

FOREIGN PATENT DOCUMENTS

| | | |
|---|---|---|
| EP | 1 178 267 A | 2/2002 |
| JP | 4-264366 A | 9/1992 |
| JP | 7-063435 A | 3/1995 |

OTHER PUBLICATIONS

Patent Abstracts of Japan vol. 017, No. 050 (E-1314), Jan. 29, 1993.

* cited by examiner

AIR CONDITIONER

TECHNICAL FIELD

The present invention generally relates to an air conditioner and, more particularly, to an air conditioner utilizing exhaust heat.

BACKGROUND ART

There have been devised air conditioners adapted to perform cooling, heating, or air-conditioning by utilizing exhaust heat from various heat-producing apparatuses, equipment, and facilities. Among such air conditioners which inventors of the invention devised, an air conditioner for performing at least cooling is devised in such a way as to include an absorption chiller of what is called the heat transfer medium drive type, which is adapted to recover exhaust heat and driven by a heat transfer medium, and as to perform cooling by supplying an indoor unit with a refrigerant cooled by the absorption chiller. Further, an air conditioner for performing at least heating is devised in such a way as to recover exhaust heat and as to perform heating by supplying an indoor unit with a heat transfer medium. Moreover, such air conditioners adapted to perform air-conditioning by utilizing exhaust heat are devised in such a manner as to have an auxiliary heating device for heating a heat transfer medium in a case, in which an amount of exhaust heat from an exhaust heat source is insufficient for performing cooling or heating, by utilizing heat of combustion in a burner or heat from a heater so as to make up for the shortage of heat, and also devised so that the temperature of the heat transfer medium is maintained in a predetermined range by controlling an operation of driving such an auxiliary heating device according to the temperature of the heat transfer medium so that the heat transfer medium always has a sufficient amount of heat.

Meanwhile, even in the case that the amount of exhaust heat is at a level insufficient for maintaining the temperature of the heat transfer medium within the predetermined range during a cooling operation, when the cooling load of the indoor unit is low, the absorption chiller sometimes can sufficiently cool the refrigerant and provide a cooled state by using only such an amount of exhaust heat. In such a case, the air conditioner, which is adapted to maintain the temperature of the heat transfer medium within the predetermined range by controlling the operation of driving the auxiliary heating device according to the temperature of the heating device, consumes energy by unnecessarily heating the heat transfer medium by means of the auxiliary heating device regardless of the cooling load. Therefore, even though the air conditioner is of the type utilizing exhaust heat, the energy-saving capability thereof is degraded.

DISCLOSURE OF INVENTION

The problem to be solved by the invention is to enhance the energy-saving capability of an air conditioner.

To achieve the foregoing object, according to an aspect of the invention, there is provided an air conditioner, which comprises an exhaust heat recovery unit for recovering exhaust heat in a heat transfer medium, a heat transfer medium passage in which the heat transfer medium outputted from the exhaust heat recovery unit flows, an auxiliary heating device, provided in the heat transfer medium passage, for heating the heat transfer medium, an absorption chiller, to which the heat transfer medium passage is connected, to be driven by heat of the heat transfer medium, a refrigerant passage, through which a refrigerant outputted from the absorption chiller flows, an indoor unit to which the refrigerant is supplied through the refrigerant passage, a heat transfer medium temperature detecting means for detecting a temperature of the heat transfer medium flowing through the heat transfer medium passage, a refrigerant temperature detecting means for detecting a temperature of the refrigerant flowing through the refrigerant passage, and a control portion for controlling an operation of driving the auxiliary heating device. In this air conditioner, on startup, the control portion controls an operation of driving the auxiliary heating device according to the temperature of the heat transfer medium, which is detected by the heat transfer medium temperature detecting means. When the temperature of the refrigerant, which is detected by the refrigerant temperature detecting means, is equal to or lower than a predetermined temperature, the control portion decides that a startup operation is completed. Upon completion of the startup operation, the control portion controls an operation of driving the auxiliary heating device according to the temperature of the refrigerant, which is detected by the refrigerant temperature detecting means.

With such a configuration, an operation of driving the auxiliary heating device is controlled according to the temperature of the refrigerant. Thus, when the amount of exhaust heat is sufficient for cooling the refrigerant in the absorption chiller regardless of the temperature of the heat transfer medium, that is, when the temperature of the refrigerant cooled by the absorption chiller is at a level at which the cooling load can be sufficiently cooled, the operation of driving the auxiliary heating device is not performed. Further, on the startup of the air conditioner, it is necessary to change the state of the absorption chiller into a state, in which the refrigerant can be sufficiently cooled as soon as possible, that is, a stationary state by recirculating adsorbent in the adsorption chiller to thereby raise the internal temperature of a regenerator of the absorption chiller. Therefore, increase in the rise time from the startup to a time, at which the state of the refrigerator is changed into the stationary state, is restrained by controlling, on the startup, an operation of driving the auxiliary heating device according to the temperature of the heat transfer medium and by deciding, when the temperature of the refrigerant reaches a predetermined temperature, that the startup operation is completed. Thus, when the temperature of the refrigerant is at a level, which is sufficient for performing cooling, regardless of the temperature of the heat transfer medium, the operation of driving the auxiliary heating device is not performed. Consequently, the energy-saving capability of the air conditioner can be enhanced.

Meanwhile, even during the operation of driving the auxiliary heating device is controlled according to the temperature of the refrigerant during the cooling operation, for example, when the cooling load is small, or when the cooling load intermittently occurs, in the case that the amount of exhaust heat varies by iteratively increasing and decreasing, the temperature of the refrigerant may vary at a temperatures, which is close to a predetermined temperature, in a short time that is several tens of seconds or several minutes. In such a case, the temperature of the refrigerant temporarily rises to a level that is equal to or higher than the set temperature. Then, the temperature of the refrigerant quickly drops to a level that is lower than the set temperature. This results in occurrences of operations, in which the auxiliary heating device stops immediately after driven, and in which the heating value of the auxiliary heating device is decreased just after increased. Thus, in the case that an operation of driving the auxiliary heating device is controlled according to the temperature of the refrigerant during the exhaust heat is recovered and the heat transfer medium is heated, the energy-saving capability is degraded by driving the auxiliary heating device or increasing the heating value of the auxiliary heating device in spite of the state in which the temperature of the refrigerant drops without driving the auxiliary heating device and without increasing the heating value thereof.

To solve this problem, in the case of another air conditioner according to another aspect of the invention, the control portion is constructed in such a way as to control an operation of driving the auxiliary heating device according to the temperature of the refrigerant, which is detected by the refrigerant detecting means, and as to drive the auxiliary heating device or increase the heating value thereof when the temperature of the refrigerant, which is detected by the refrigerant temperature detecting means, is equal to or higher than a predetermined temperature and when the state, in which the detected temperature of the refrigerant is equal to or higher than the predetermined temperature, continues for a predetermined time period.

With such a configuration, even when the temperature of the refrigerant becomes equal to or higher than the predetermined temperature, an operation of driving the auxiliary heating device or changing the heating value thereof is not immediately performed. Instead, after a lapse of a predetermined time period since the temperature of the refrigerant becomes equal to or higher than the predetermined temperature, an operation of driving the auxiliary heating device or changing the heating value thereof is performed. Therefore, in the case that the temperature of the refrigerant becomes lower than the predetermined temperature in the predetermined time period, an operation of driving the auxiliary heating device or changing the heating value thereof is not performed. Thus, the energy consumed in the auxiliary heating device can be reduced. Consequently, the energy-saving capability of the air conditioner can be enhanced still more.

Further, even in the case that during a heating operation, the heating operation is performed by causing the heat transfer medium, in which exhaust heat is recovered, to flow in the indoor unit, and that the amount of exhaust heat from the exhaust heat source repeatedly increases and decreases and thus varies, for example, when a heating load is small or intermittently produced, the temperature of the heat transfer medium sometimes varies at a temperature, which is close to the preset temperature, because an operation of driving the auxiliary heating device or changing the heating value thereof. Even at that time, similarly as the air conditioner performs during the cooling operation, when the temperature of the heat transfer medium temporarily drops to a level, which is equal to or lower than the preset temperature, and then immediately rises to a level that is higher than the preset temperature, the auxiliary heating device may be driven and then quickly stop. Alternatively, the heating value of the heating device may increase once and then immediately decrease. Thus, in the case that an operation of driving the auxiliary heating device is controlled according to the temperature of the heat transfer medium during the exhaust heat is recovered and the heat transfer medium is heated, the energy-saving capability is degraded by driving the auxiliary heating device or increasing the heating value of the auxiliary heating device in spite of the state in which the temperature of the refrigerant rises without driving the auxiliary heating device and without increasing the heating value thereof.

To solve this problem, according to another aspect of the invention, there is provided an air conditioner that comprises an exhaust heat recovery unit for recovering exhaust heat in a heat transfer medium, a heat transfer medium passage in which the heat transfer medium outputted from the exhaust heat recovery unit flows, an auxiliary heating device, provided in the heat transfer medium passage, for heating the heat transfer medium, an absorption chiller, to which the heat transfer medium passage is connected, to be driven by heat of the heat transfer medium, a refrigerant passage, through which a refrigerant outputted from the absorption chiller flows, an indoor unit to which the refrigerant is supplied through the refrigerant passage, a heat transfer medium temperature detecting means for detecting a temperature of the heat transfer medium flowing through the heat transfer medium passage, a refrigerant temperature detecting means for detecting a temperature of the refrigerant flowing through the refrigerant passage, and a control portion for controlling an operation of driving the auxiliary heating device. This control portion controls an operation of driving the auxiliary heating device according to the temperature of the heat transfer medium, which is detected by the heat transfer medium temperature detecting means. During a state in which the heat transfer medium is heated by exhaust heat, the control portion drives the auxiliary heating device or increases a heating value of the auxiliary heating device in the case that a condition, in which the temperature of the heat transfer medium detected by the refrigerant temperature detecting means is equal to or lower than a predetermined temperature, lasts for a predetermined time period.

With such a configuration, even when the temperature of the heat transfer medium becomes equal to or higher than the predetermined temperature, an operation of driving the auxiliary heating device or changing the heating value thereof is not immediately performed. Instead, after a lapse of a predetermined time period since the temperature of the heat transfer medium becomes equal to or higher than the predetermined temperature, an operation of driving the auxiliary heating device or changing the heating value thereof is performed. Therefore, in the case that the temperature of the heat transfer medium becomes lower than the predetermined temperature in the predetermined time period, an operation of driving the auxiliary heating device or changing the heating value thereof is not performed. Thus, the energy consumed in the auxiliary heating device can be reduced. Consequently, the energy-saving capability of the air conditioner can be enhanced.

Moreover, according to another aspect of the invention, there is provided an air conditioner that comprises an exhaust heat recovery unit for recovering exhaust heat in a heat transfer medium, a heat transfer medium passage in which the heat transfer medium outputted from the exhaust heat recovery unit flows, an auxiliary heating device, provided in the heat transfer medium passage, for heating the heat transfer medium, an absorption chiller, to which the heat transfer medium passage is connected, to be driven by heat of the heat transfer medium, a refrigerant passage, through which a refrigerant outputted from the absorption chiller flows, an indoor unit to which the refrigerant is supplied through the refrigerant passage, a heat transfer medium temperature detecting means for detecting a temperature of the heat transfer medium flowing through the heat transfer medium passage, a refrigerant temperature detecting means for detecting a temperature of the refrigerant flowing through the refrigerant passage, and a control portion for controlling an operation of driving the auxiliary heating device. In this air conditioner, on startup of a cooling operation, the control portion controls an operation of driving the auxiliary heating device according to the temperature of the heat transfer medium, which is detected by the heat transfer medium temperature detecting means. When the temperature of the refrigerant, which is detected by the refrigerant temperature detecting means, is equal to or lower than a first temperature, the control portion decides that the startup of a cooling operation is completed. Upon completion of the startup of the cooling operation, the control portion controls an operation of driving the auxiliary heating device according to the temperature of the refrigerant, which is detected by the refrigerant temperature detecting means. During a state in which the heat transfer medium is heated by exhaust heat, the control portion drives the auxiliary heating device or increases a heating value of the auxiliary heating device in the case that the temperature of the heat transfer medium detected by the refrigerant temperature detecting means is equal to or lower than a second temperature, which is higher than the first temperature, and that a condition, in which the temperature of the heat transfer medium detected by the refrigerant temperature detecting means is equal to or lower than the second temperature, lasts for a predetermined time period. With such a configuration, which is preferable, the energy-saving capability of this air conditioner can be enhanced still more without increasing the rise time.

Furthermore, according to another aspect of the invention, there is provided an air conditioner that comprises an exhaust heat recovery unit for recovering exhaust heat in a heat transfer medium, a heat transfer medium passage in which the heat transfer medium outputted from the exhaust heat recovery unit flows, an auxiliary heating device, provided in the heat transfer medium passage, for heating the heat transfer medium, an absorption chiller, to which the heat transfer medium passage is connected, to be driven by heat of the heat transfer medium, a refrigerant passage, through which a refrigerant outputted from the absorption chiller flows, a valve provided with the heat transfer medium passage, a bypass passage branching off the valve, an indoor unit to which the refrigerant is supplied through one of bypass passage and the refrigerant passage, a heat transfer medium temperature detecting means for detecting a temperature of the heat transfer medium flowing through the heat transfer medium passage, a refrigerant temperature detecting means for detecting a temperature of the refrigerant flowing through the refrigerant passage, and a control portion for controlling an operation of driving the auxiliary heating device. In this air conditioner, during a cooling operation, the control portion controls an operation of driving the auxiliary heating device according to the temperature of the refrigerant, which is detected by the refrigerant temperature detecting means. During a state in which the heat transfer medium is heated by exhaust heat, the control portion drives the auxiliary heating device or increases a heating value of the auxiliary heating device in the case that the temperature of the refrigerant detected by the refrigerant temperature detecting means is equal to or lower than a first temperature, and that a condition, in which the temperature of the refrigerant detected by the refrigerant temperature detecting means is equal to or lower than the first temperature, lasts for a first time period. During a heating operation, the control portion controls an operation of driving the auxiliary heating device according to the temperature of the heat transfer medium, which is detected by the heat transfer medium temperature detecting means. Moreover, during a state in which the heat transfer medium is heated by exhaust heat, the control portion drives the auxiliary heating device or increases a heating value of the auxiliary heating device in the case that the temperature of the heat transfer medium detected by the heat transfer medium temperature detecting means is equal to or lower than a second temperature, which is higher than the first temperature, and that a condition, in which the temperature of the heat transfer medium detected by the refrigerant temperature detecting means is equal to or lower than the second temperature, lasts for a second time period. With such a configuration, which is preferable, the energy-saving capability of the air conditioner enabled to perform air-conditioning can be enhanced.

BEST MODE FOR CARRYING OUT THE INVENTION

A preferred embodiment of the present invention will now be described in detail with reference to the accompanying drawings.

FIRST EMBODIMENT

Figure 1:
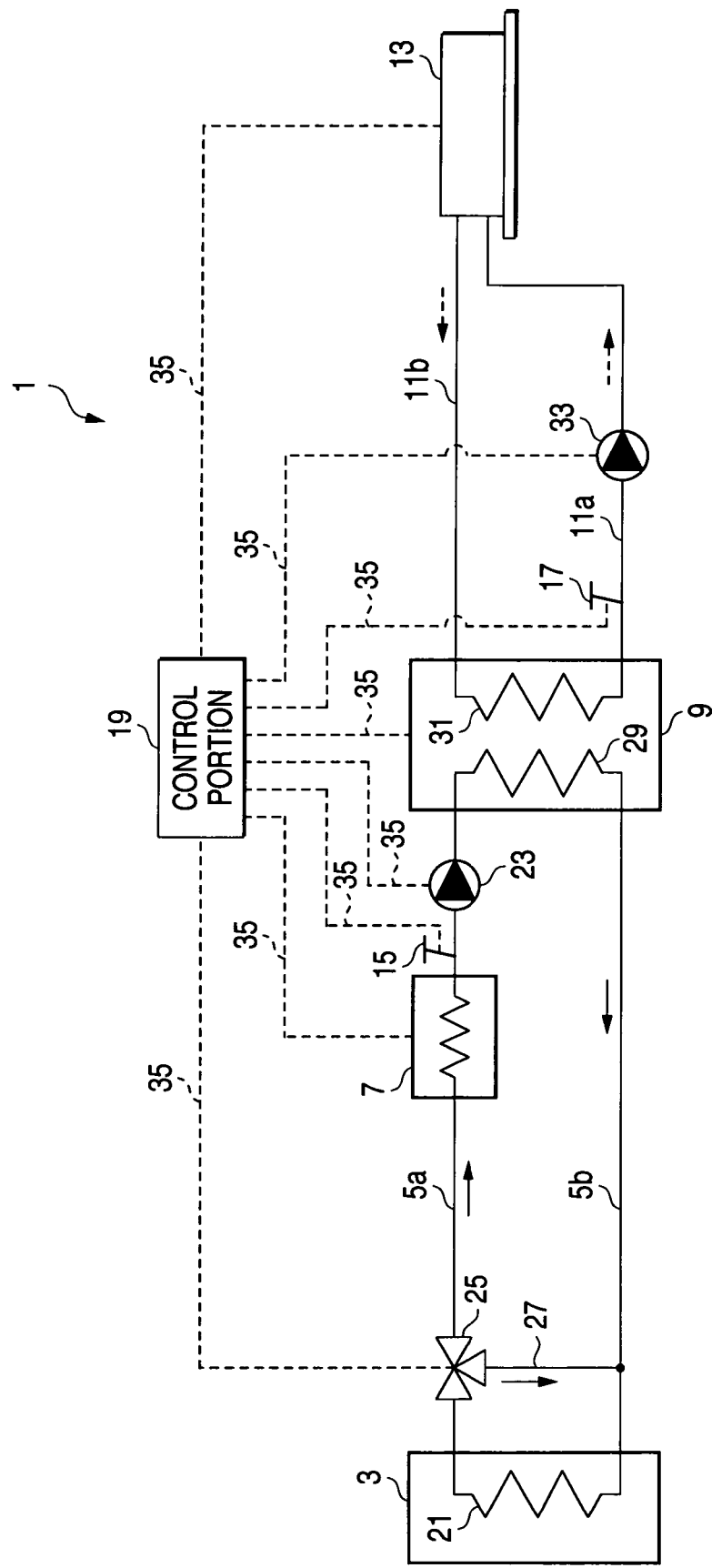
FIG. 1 is a schematic diagram illustrating the configuration and operation of a first embodiment of an air conditioner to which the invention is applied.
Figure 2:
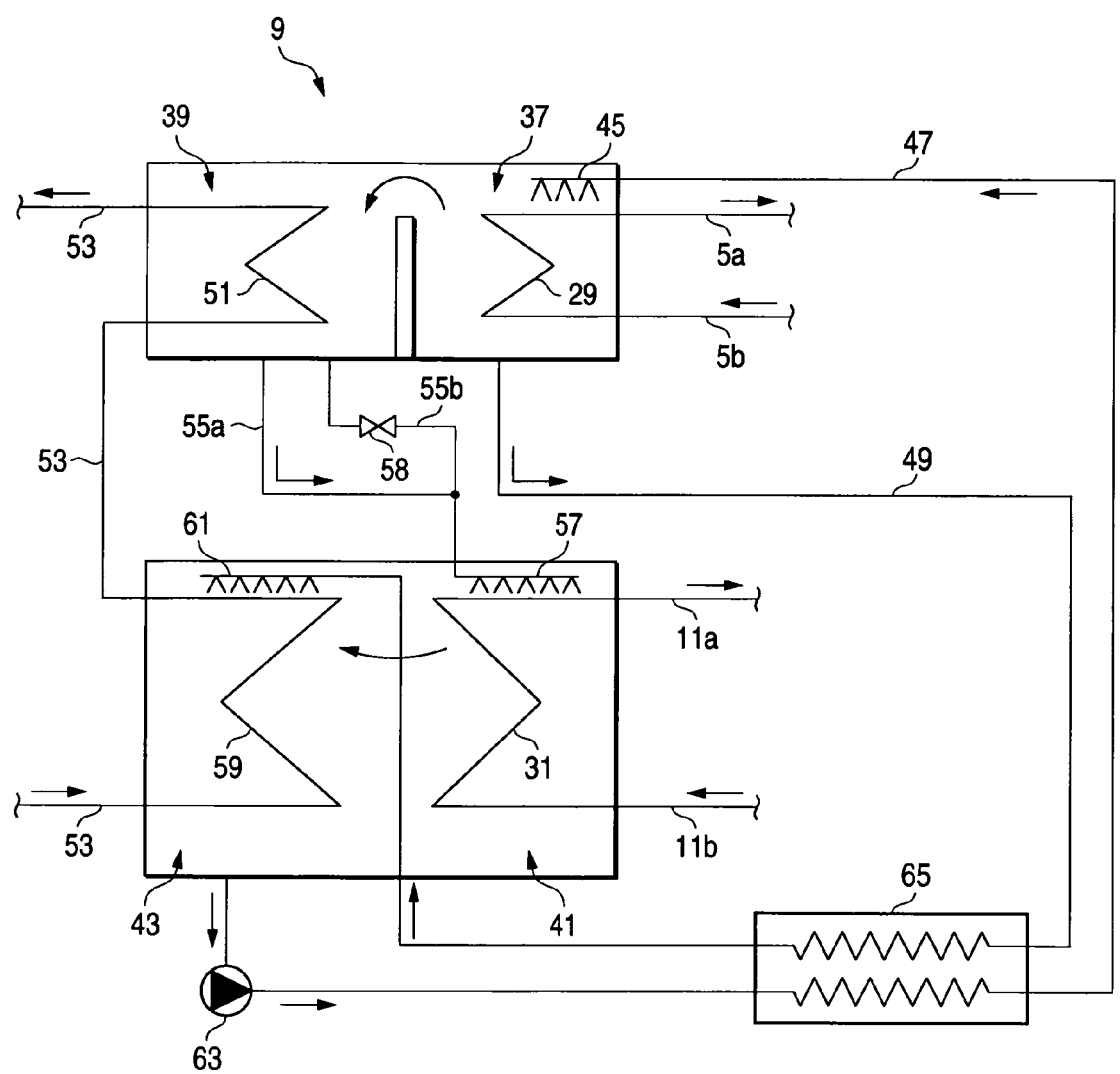
FIG. 2 is a schematic diagram illustrating the configuration and operation of an absorption chiller of the air conditioner that is the first embodiment to which the invention is applied.

Hereinafter, a first embodiment of an air conditioner, to which the invention is applied, is described with reference to FIGS. 1 to 3B. FIG. 1 is a schematic diagram illustrating the configuration and operation of the first embodiment of the air conditioner to which the invention is applied. FIG. 2 is a schematic diagram illustrating the configuration and operation of an absorption chiller of the air conditioner that is the first embodiment to which the invention is applied.

Figure 3A:
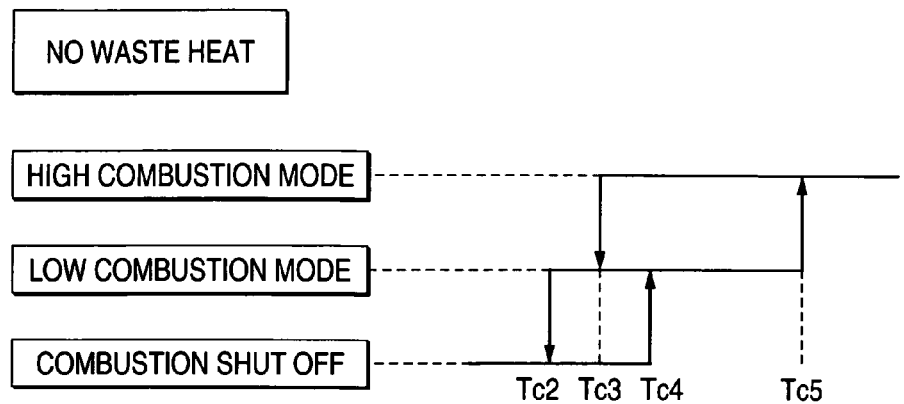
FIG. 3A is a diagram illustrating an operation of an auxiliary heating device in the case that there is no exhaust heat from an exhaust heat source during a cooling operation.
Figure 3B:
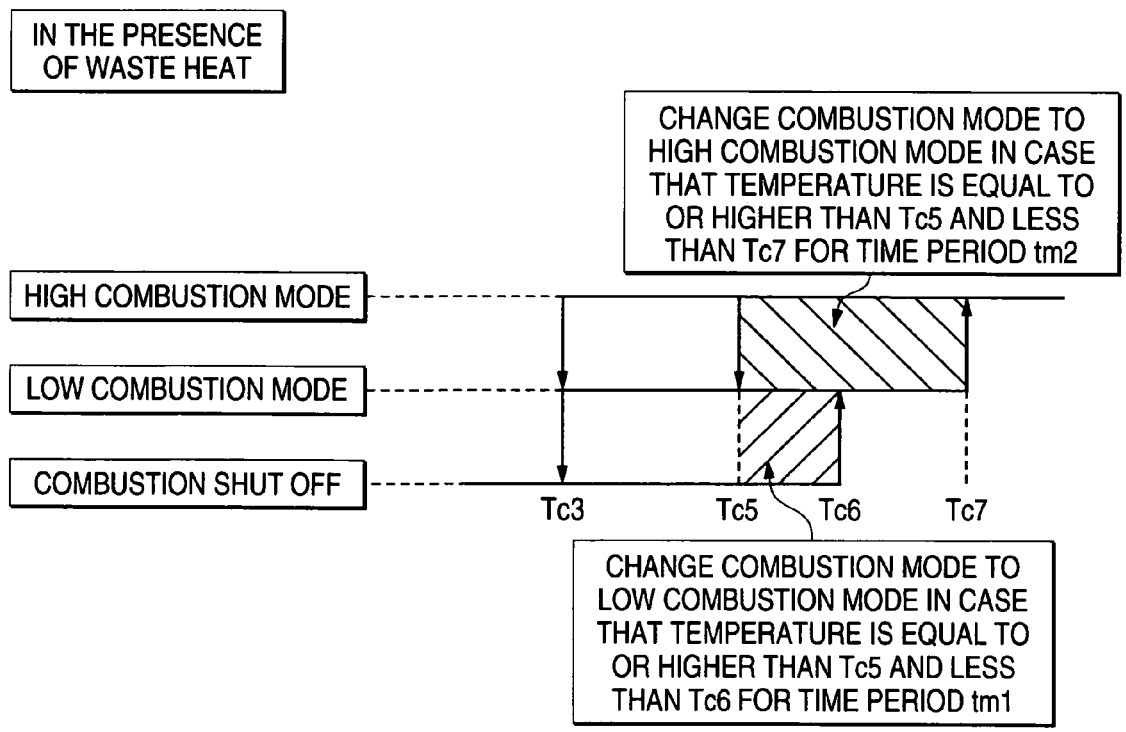
FIG. 3B is a diagram illustrating an operation of the auxiliary heating device in the case that there is exhaust heat from the exhaust heat source during a cooling operation.

FIG. 3A is a diagram illustrating an operation of an auxiliary heating device in the case that there is no exhaust heat from an exhaust heat source during a cooling operation. FIG. 3B is a diagram illustrating an operation of the auxiliary heating device in the case that there is exhaust heat from the exhaust heat source during a cooling operation. Incidentally, in the following description of this embodiment, the air conditioner designed specifically for cooling is described by way of example.

The air conditioner 1 of this embodiment comprises an exhaust heat recovery unit 3, heat transfer medium pipes 5a, 5b, an auxiliary boiler 7 serving as an auxiliary heating device, an absorption chiller 9, refrigerant pipes 11a, 11b, an indoor unit 13, a heat transfer medium temperature sensor 15, a refrigerant temperature sensor 17, and a control portion 19, as shown in FIG. 1. The exhaust heat recovery unit 3 has a heat exchange portion 21 including a pipe, through which the heat transfer medium, such as water, flows. The exhaust heat recovery unit 3 recovers exhaust heat, which outputted from the exhaust heat source, such as an engine, in the heat transfer medium contained in the heat exchange portion 21. The heat transfer medium pipes 5a and 5b are operative to recirculate the heat transfer medium between the exhaust heat recovery unit 3 and the absorption chiller 9. In the heat transfer medium pipe 5a, the heat transfer medium heated by recovering exhaust heat in the heat exchanging portion 21 of the exhaust heat recovery unit 3, while the heat transfer medium radiating heat in the absorption chiller 9 flows through the heat transfer medium pipe 5b.

The heat transfer medium pipe 5a is provided with an auxiliary boiler 7. A heat transfer medium temperature sensor 15 for detecting the temperature of the heat transfer medium flowing out of the auxiliary boiler 7, and a heat transfer medium pump 23 for causing the heat transfer medium to flow in the heat transfer medium pipes 5a and 5b are provided at a portion located at the downstream side of a flow of the heat transfer medium from the auxiliary boiler 7 of the heat transfer medium pipe 5a. A three-way valve 25 is provided at a portion located at the upstream side of the flow of the heat transfer medium from the auxiliary boiler 7 and in an outlet portion from the exhaust heat recovery unit 3. A non-heat-recovery pipe 27 is provided between the three-way valve 25 and an inlet portion to the exhaust heat recovery unit 3 of the heat transfer medium pipe 5b. That is, the non-heat-recovery pipe 27 is connected to the three-way valve 25 at an end thereof and also connected to the inlet portion to the exhaust heat recovery unit 3 at the other end.

The auxiliary boiler 7 has a burner (not shown). The heat transfer medium is heated by combustion in this burner. The absorption chiller 9 is of the heat transfer medium drive type that has a regenerator for heating adsorbent by heat of the heat transfer medium. The heat transfer medium pipes 5a and 5b are connected to the heat exchanger 29 that is provided in the regenerator of the absorption chiller 9 and that serves as a passage for the heat transfer medium. Further, the absorption chiller 9 has a cooling water pipe and a cooling tower (not shown) in which cooling water to be used in a condenser of the absorption chiller 9 is circulated. Refrigerant pipes 11a and 11b are used for circulating the refrigerant, for example, water between the absorption chiller 9 and the indoor unit 13, and connected to a heat exchanger 31 that is provided in an evaporator of the absorption chiller 9 and that serves as a passage for the refrigerator. In the refrigerant pipe 11a, the refrigerant cooled by the absorption chiller 9 is caused to flow, while in the refrigerant pipe 11b, the refrigerant undergoing heat exchange in the indoor unit 13 is caused to flow. The refrigerant pipe 11a is provided with the refrigerant temperature sensor 17 for detecting the temperature of the refrigerant flowing out of the absorption chiller 9, and a refrigerant pump 33 for causing the refrigerant to flow in the refrigerant pipes 11a and 11b in sequence.

The control portion 19 is electrically connected to the three-way valve 25, the auxiliary boiler 7, the heat transfer medium temperature sensor 15, the heat transfer medium pump 23, a pump (not shown) for causing the cooling water to flow therethrough and a pump (not shown) for causing the adsorbent to flow therethrough, which are provided in the absorption chiller 9, the refrigerant temperature sensor 17, the refrigerant pump 33, and a control part (not shown) of the indoor unit 13 through wires 35. Further, the control portion 19 is also electrically connected to a control part (not shown) of the engine serving as the exhaust heat source through wires (not shown), and receives information indicating whether or not the exhaust heat source is driven and operates.

Hereinafter, the configuration of the absorption chiller 9 of this embodiment is described. As illustrated in FIG. 2, the absorption chiller 9 of this embodiment comprises a regenerator 37, a condenser 39, an evaporator 41, and an absorber 43. The regenerator 37 contains the heat exchanger 29 that is connected to the heat transfer medium pipes 5a and 5b, and that permits the heat transfer medium to flow therethrough. A spraying portion 45 for spraying diluted solution onto the heat exchanger 29 is provided above the heat exchanger 29. A diluted solution pipe 47, through which the diluted solution generated in the absorber 43 flows, is connected to the spraying portion 45. A concentrated solution pipe 49 for introducing a concentrated solution, which is accumulated in the bottom portion of the regenerator 37, to the absorber 43 is connected to the bottom portion of the regenerator 37. Furthermore, the regenerator 37 is provided in such a manner as to communicate with the condenser 39 so that vapor generated in the regenerator 37 can flow thereinto.

The condenser 39 contains a heat exchanger 51, into which cooling water cooled in a cooling tower (not shown) flows. A cooling water pipe 53 is connected to the heat exchanger 51 so that the cooling water can be circulated between the heat exchanger 51 and the cooling tower (not shown). Further, a refrigerant pipe 55a, in which refrigerant liquid accumulated in the bottom portion of the condenser 39 flows, is connected to the bottom portion of the condenser 39 at an end thereof and also connected to a spraying portion 57 for spraying the refrigerant liquid onto the heat exchanger 31 provided in the evaporator 41 at the other end thereof. Moreover, a refrigerant liquid amount adjusting pipe 55b for adjusting an amount of the sprayed refrigerant liquid in the evaporator 41 is connected to the bottom portion of the condenser 39 at an end thereof in parallel with the refrigerant liquid pipe 55a, and also connected to the spraying portion 57 provided in the evaporator 41 at the other end thereof together with the refrigerant liquid pipe 55a. A refrigerant liquid amount adjusting valve 58 for adjusting the flow rate of the refrigerant is provided in the refrigerant liquid amount adjusting pipe 55b. In the evaporator 41, a heat exchanger 31 connected to the refrigerant pipes 11a and 11b for sending a cooling refrigerant to the indoor unit 13 is provided. The spraying portion 57 is provided above the heat exchanger 31. Further, the evaporator 41 is provided in such a way as to communicate with the absorber 43 so that the vapor generated in the evaporator 41 can flow therethrough.

The absorber 43 contains a heat exchanger 59 through which the cooling water cooled by the cooling tower (not shown). The cooling water pipe 53 is connected to the heat exchanger 59 of the absorber 43 in such a manner as to enable the cooling water to circulate between the heat exchanger 59 and the cooling tower (not shown). A spraying portion 61 for spraying concentrated solution generated in the regenerator 37 onto the heat exchanger 59 is provided above the heat exchanger 59 of the absorber 43. A concentrated solution pipe 49 is connected to the spraying portion 61. Further, a diluted solution pipe 47, through which diluted solution, which is accumulated in the bottom portion of the absorber 43, flows, is connected to the bottom portion of the absorber 43. The diluted solution pipe 47 is provided with a pump 63 that sends the diluted solution to the spraying portion 45 of the regenerator 37. Furthermore, the heat exchanger 51 of the condenser 39 and the heat exchanger 59 of the absorber 43 are provided in series to the cooling water 53. The cooling water cooled by the cooling tower (not shown) flows through the heat exchanger 59 of the absorber 43 and the heat exchanger 51 of the condenser 39 in sequence and thus circulates therebetween. A heat exchange 65 for performing heat exchange between the diluted solution contained in the diluted solution pipe 47 and the concentrated solution contained in the concentrated solution pipe 49 is provided between the pump 63 provided in the diluted solution pipe 47 and the regenerator 37.

In the air conditioner 1 of such a condition of this embodiment, when there is a request to air-condition and the commencement of a cooling operation is directed, the control portion 19 starts a cooling startup operation. In the cooling startup operation, the heat transfer medium pump 23 and the refrigerant pump 33 are operated so that the heat transfer medium and the cooling water flow through the absorption chiller 9 and circulate through the heat transfer medium pipes 5$a$ and 5$b$ and the refrigerant pipes 11$a$ and 11$b$. Moreover, the pump 63 of the absorption chiller 9 and a cooling fan of the cooling tower (not shown) are operated. At that time, the control portion 19 controls combustion in the auxiliary boiler 7 according to the temperature of the heating medium, which is detected by the heat transfer medium temperature sensor 15. That is, the heat transfer medium is heated by utilizing the exhaust heat recovered by the exhaust heat recovery unit 3 and the combustion performed in the auxiliary boiler 7 until the temperature of the heat transfer medium reaches a preset temperature Th1. When the temperature of the heat transfer medium becomes equal to or higher than the predetermined temperature Th1, the control portion 19 stops the combustion in the auxiliary boiler 7. During this time period, the control portion 19 detects the temperature of the refrigerant by use of the refrigerant temperature sensor 17. When the refrigerant cooled by the absorption chiller 9 reaches the preset temperature Tc1, the control portion 19 decides that the cooling startup operation is completed. Thus, the air conditioner is put into a cooling stationary operation mode. Incidentally, in FIG. 1, solid arrows indicate the directions in which the heat media flow, while dashed arrows indicate directions in which the refrigerants flow.

When the air conditioner starts a cooling stationary operation, the control portion 19 controls the combustion in the auxiliary boiler 7 according to the temperature of the refrigerant, which is detected by the refrigerant temperature sensor 17. At that time, in the case that there is no exhaust heat, for example, the case that the exhaust heat source is stopped, the control portion 19 the combustion in the auxiliary boiler 7 within the range of the temperature of the refrigerant, which ranges from Tc2 to Tc5. Incidentally, it is assumed herein that Tc2<Tc3<Tc4<Tc5. When the temperature of the refrigerant rises owing to increase in the cooling load and the value thereof detected by the refrigerant temperature sensor 17 reaches Tc4, the control portion 19 turns on the burner (not shown) of the auxiliary boiler 7 and starts the combustion in a low combustion mode and heats the heat transfer medium. In the case that thereafter, the temperatures of the refrigerant keeps rising, and that the temperature of the refrigerant, which is detected by the refrigerant temperature sensor, reaches Tc5, the control portion 19 changes the mode of the combustion from the low combustion mode to a high combustion mode, and also increases the heating value. Thus, the temperature of the heat transfer medium rises, and the refrigerant is sufficiently cooled by the absorption chiller 9. Consequently, the temperature of the refrigerant falls down. When the temperature of the refrigerant, which is detected by the refrigerant temperature sensor 17, reaches Tc3, the control portion 19 changes the combustion mode of the auxiliary boiler 7 from the high combustion mode to the low combustion mode, and reduces the heating value thereof. Even after the heating value is reduced, the temperature of the refrigerant keeps dropping. When the temperature of the refrigerant, which is detected by the refrigerant temperature sensor 17 reaches Tc2, the control portion 19 turns off the burner (not shown) of the auxiliary boiler 17 and stops the heating of the heat transfer medium.

In the case that the exhaust heat source is operated, and that the heat transfer medium can be heated by exhaust heat, as shown in FIG. 3B, the control portion 19 controls the combustion in the auxiliary boiler 7 within the range of the temperature of the refrigerant, which ranges from Tc3 to Tc7. Incidentally, it is assumed herein that Tc3<Tc5<Tc6<Tc7, and that Tc4<Tc5. When the temperature of the refrigerant rises owing to increase in the cooling load and to variation in the amount of the heat, and the temperature thereof detected by the refrigerant temperature sensor 17 reaches Tc5, the control portion 19 performs measurement of length of a time. When a condition, in which the temperature of the refrigerant detected by the refrigerant temperature sensor 17 is equal to or higher than Tc5, lasts for a time period tm1, that is, when a time period tm1 lapses after the temperature of the refrigerant becomes equal to or higher than Tc5, the control portion 19 turns on the burner (not shown) of the auxiliary boiler 7 and starts the combustion therein in the low combustion mode and heats the heat transfer medium. Alternatively, when the temperature of the refrigerant keeps rising and reaches Tc6, the control portion 19 turns on the burner (not shown) of the auxiliary boiler 7 regardless of a time period lapsed since the detected temperature of the refrigerant reaches Tc5. Then, the control portion 19 starts the combustion therein in the low combustion mode and heats the heat transfer medium. In other words, when the temperature of the refrigerant reaches Tc6, or when a condition, in which the temperature of the refrigerant is equal to or higher than Tc5 and less than Tc6, lasts for a time period tm1, the control portion 19 turns on the burner (not shown) of the auxiliary boiler 7 and starts the combustion therein in the low combustion mode and heats the heat transfer medium.

In the case that thereafter, the temperature of the refrigerant does not become less than Tc5 and that a condition, in which the temperature of the refrigerant is equal to or higher than Tc5, lasts for a time period tm2 (incidentally, in this embodiment, it is assumed that tm1=tm2/2), that is, when the time period tm2 elapses since the temperature of the refrigerant becomes equal to or higher than Tc5, the control portion 19 changes the mode of the combustion in the auxiliary boiler 7 from the low combustion mode to the high combustion mode, and increases the heating value thereof. Alternatively, when the temperature of the refrigerant keeps rising and reaches Tc7, the control portion 19 turns on the burner (not shown) of the auxiliary boiler 7 regardless of a time period lapsed since the detected temperature of the refrigerant reaches Tc5. Then, the control portion 19 changes the mode of combustion therein from the low combustion mode to the high combustion mode, and increases the heating value thereof. In other words, when the temperature of the refrigerant reaches Tc7, or when a condition, in which the temperature of the refrigerant is equal to or higher than Tc5 and less than Tc7, lasts for a time period tm2, the control portion 19 changes the mode of combustion in the auxiliary boiler 7 from the low combustion mode to the high combustion mode, and increases the heating value thereof. Thus, the temperature of the heat transfer medium rises. The refrigerant is sufficiently cooled by the absorption chiller 9. Then, the temperature of the refrigerant falls down. When the temperature of the refrigerant, which is detected by the refrigerant temperature sensor 17, reaches Tc3, the control portion 19 turns off the burner (not shown) of the auxiliary boiler 7, and stops the heating of the heat transfer medium. Incidentally, in this embodiment, it is assumed that Tc3=Tc1.

Incidentally, during the cooling stationary operation, the control portion 19 controls an operation of the auxiliary boiler 7 according to the temperature of the refrigerant. Further, the control portion 19 detects the temperature of the heat transfer medium by using the heat transfer medium temperature sensor 15. Moreover, when the temperature of the heat transfer medium reaches an overtemperature Th2 (incidentally, it is assumed that Th1<Th2), when combustion is performed in the auxiliary boiler 7, the control portion 19 stops the combustion. Further, as illustrated in FIG. 1, the three-way valve 25 is switched, so that a part of the heat transfer medium flowing through the heat transfer medium pipe 5a is caused to flow into the non-heat-recovery pipe 27. Thus, the recovery of exhaust heat into the heat transfer medium is stopped by the control portion 19. Consequently, an occurrence of overheat of the heat transfer medium is prevented.

Further, When the temperature of the heat transfer medium reaches the overtemperature Th2, the internal temperature of the regenerator 3 of the absorption chiller 9 becomes excessively high. Thus, the adsorbent contained in the regenerator 37 is put into an overconcentrated state. Consequently, the component of the material of the adsorbent may be crystallized. This may impede an operation of driving the absorption chiller 9. Therefore, when the temperature of the heat transfer medium reaches the overtemperature Th2, the control portion 19 completely opens the refrigerant liquid amount adjusting valve 58 of the refrigerant liquid amount adjusting pipe 55b regardless of the temperature of the refrigerant used for cooling, which flows through the refrigerant pipe 11a, and the internal temperature of the evaporator 41. Further, the control portion 19 discharges the refrigerant liquid accumulated in the bottom portion of the condenser 39 into the evaporator 41, and thus reduces the concentration of the diluted solution sent to the regenerator 37 through the diluted solution pipe 47.

Thus, in the case of the air conditioner 1 of this embodiment, during the cooling stationary operation, an operation of the auxiliary boiler 7 is controlled according to the temperature of the refrigerant, which is detected by the refrigerant temperature sensor 17. Therefore, regardless of the temperature of the heat transfer medium, when the temperature of the refrigerant is sufficient for cooling, the auxiliary boiler 7 does not operate. Furthermore, in the case that the combustion in the auxiliary boiler 7 is controlled according to the temperature of the heat transfer medium, when the temperature of the heat transfer medium, in which exhaust heat is recovered, is slightly lower than a preset temperature, and even when the heating value thereof is sufficient for cooling the refrigerant in the absorption chiller 9, the auxiliary boiler 7 is driven and operates. Thus, the temperature of the heat transfer medium quickly becomes higher than the overtemperature. Then, the three-way valve 25 is switched, so that the recovery of exhaust heat to the heat transfer medium is not performed. Consequently, sometimes, the exhaust heat is not effectively utilized. However, in the case of the air conditioner 1 of this embodiment, an operation of the auxiliary boiler 7 is controlled according to the temperature of the refrigerant, which is detected by the refrigerant temperature sensor 17. Thus, in the case that the amount of exhaust heat is sufficient for cooling the refrigerant in the absorption chiller 9 and that the refrigerant is cooled to a temperature necessary for cooling, the auxiliary boiler 7 does not operate. Consequently, the three-way valve 25 is hard to switch. This embodiment can continue to perform the recovery of exhaust heat into the heat transfer medium can be continued. Moreover, the exhaust heat can be effectively utilized. Therefore, when the temperature of the refrigerant is sufficient for performing a cooling operation regardless of the temperature of the heat transfer medium, the auxiliary boiler 7 does not consume energy. Furthermore, the three-way valve 25 is hard to switch. Additionally, this embodiment can continue to perform the recovery of exhaust heat into the heat transfer medium. Thus, the energy-saving capability of the air conditioner can be enhanced.

Furthermore, when a cooling operation startup of the conventional air conditioner is performed, it is necessary to raise the temperature of the heat transfer medium to a temperature, at which the absorption chiller 9 can be driven, as soon as possible by operating the auxiliary boiler 7 regardless of the amount of exhaust heat in such a manner as to provide a maximum output thereof. In contrast, in the case of the air conditioner 1 of this embodiment, during the cooling operation startup thereof, the combustion in the auxiliary boiler 7 is controlled according to the temperature of the heat transfer medium. Thus, the temperature of the heat transfer medium can be raised to a sufficient level, at which the absorption chiller is driven, as soon as possible, irrespective of the refrigerant.

Additionally, in the case that the heat transfer medium is heated by exhaust heat outputted from the exhaust heat source in the air conditioner 1 of this embodiment, when the time period tm1 elapsed since the temperature of the refrigerant becomes equal to or higher than Tc5, the burner (not shown) of the auxiliary boiler 7 is turned on. Moreover, the combustion therein is started in the low combustion mode. Furthermore, when the time period tm2 (incidentally, tm1<tm2) elapses since the temperature of the refrigerant becomes equal to or higher than Tc5, the combustion mode of combustion in the auxiliary boiler 7 is changed from the low combustion mode to the high combustion mode, so that the heating value thereof is increased. Therefore, when the amount of exhaust heat outputted from the exhaust heat source easily varies, for example, when the cooling load is small, or when the cooling load occurs intermittently, or when a valve for controlling the amount of the refrigerant flowing into the indoor unit 13 repeats opening/closing operations, the amount of exhaust heat supplied from the exhaust heat source varies by repeating increase/decrease thereof. Thus, even when the temperature of the refrigerant temporarily rises in spite of the fact that the temperature of the refrigerant is generally liable to drop or to be unchanged, the auxiliary boiler 7 is restrained from starting combustion therein. Moreover, the heating value of the auxiliary boiler 7 is prevented from increasing. Thus, the energy consumption of the auxiliary boiler 7 is limited. Consequently, the energy-saving capability of the air conditioner can be enhanced.

Furthermore, in the case of the air conditioner 1 of this embodiment, independently of the duration of the condition, in which the temperature of the refrigerant is equal to or less than Tc5, the heating value of the auxiliary boiler 7 is increased when the temperature of the refrigerant reaches a temperature being close to a temperature at which the sufficient cooling performance of the indoor unit 13 cannot be obtained, that is, when the temperature of the refrigerant reaches Tc7. Thus, the temperature of the refrigerant can be prevented from rising to a temperature at which the sufficient cooling performance of the indoor unit 13 cannot be obtained. Consequently, this embodiment is preferable, because the comfort of the air conditioner is not lost.

Further, in the case of the air conditioner 1 of this embodiment, when the temperature of the heat transfer medium becomes equal to or higher than the overtemperature Th2, the absorption chiller 9 completely opens the refrigerant liquid amount adjusting valve 58 and lower the concentration of the diluted solution to be sent to the regenerator 37. Thus, an occurrence of crystallization due to the overconcentration of the concentrated solution in the regenerator 37 can be prevented. Therefore, inconvenience owing to overheat of the heat transfer medium is hard to occur in the absorption chiller 9. Consequently, the reliability of the air conditioner can be enhanced.

SECOND EMBODIMENT

Figure 4:
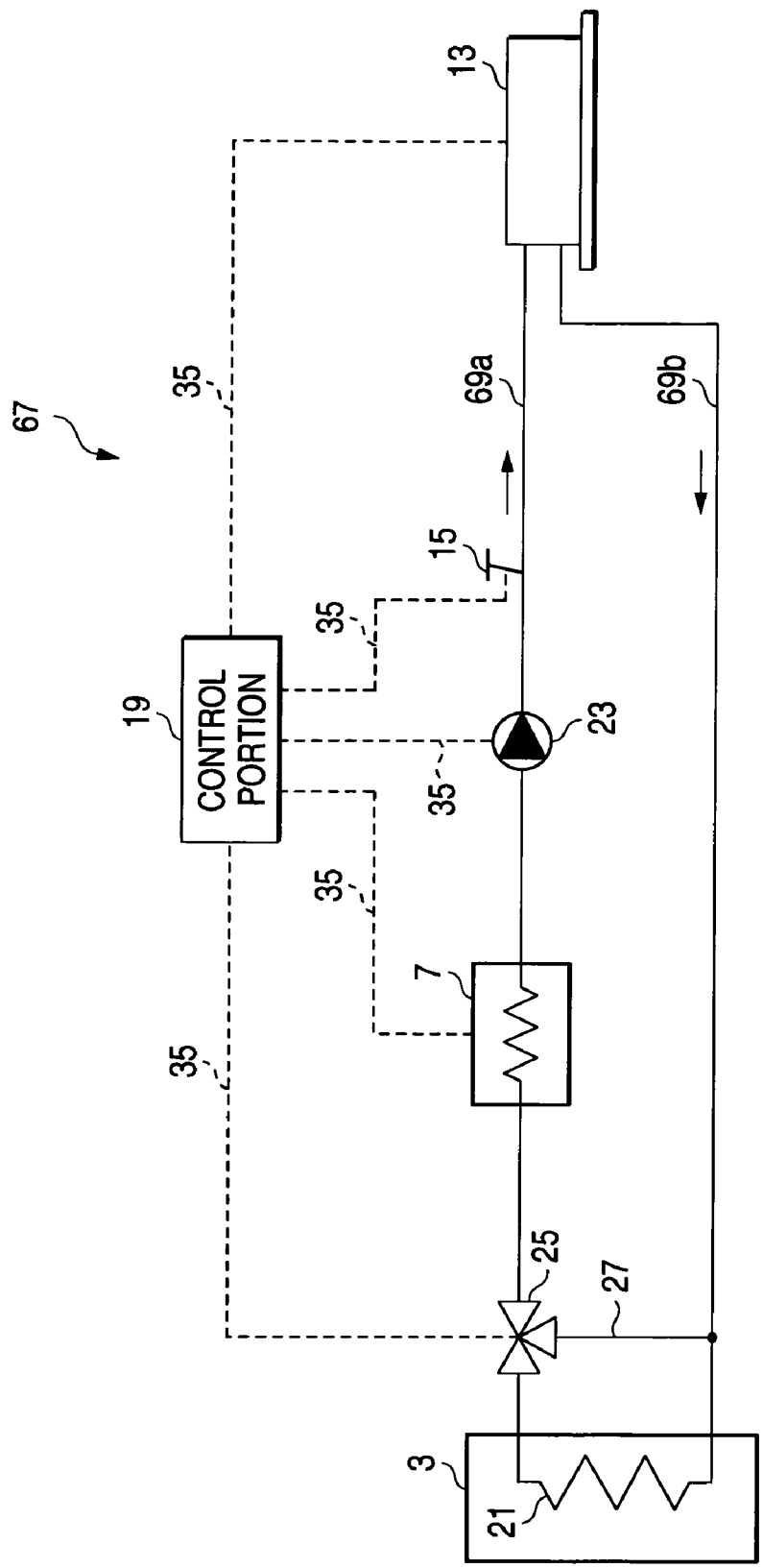
FIG. 4 is a schematic diagram illustrating the configuration and operation of a second embodiment of an air conditioner to which the invention is applied.
Figure 5A:
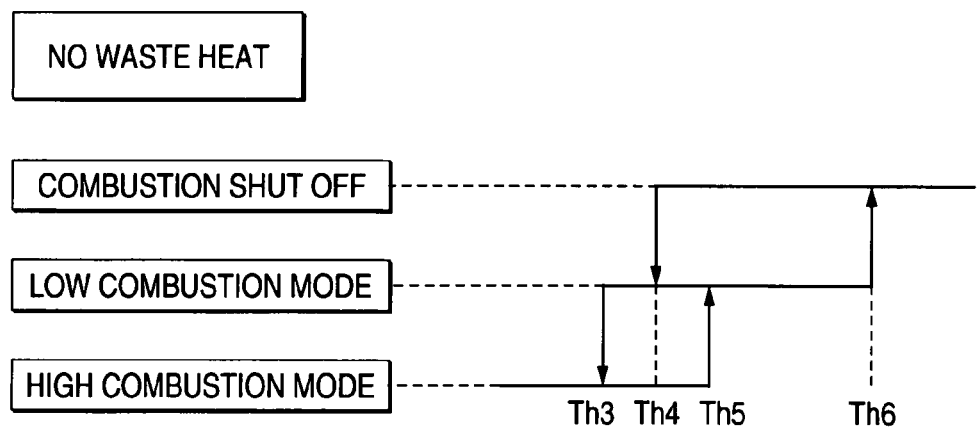
FIG. 5A is a diagram illustrating an operation of an auxiliary heating device in the case that there is no exhaust heat from an exhaust heat source during a heating operation.
Figure 5B:
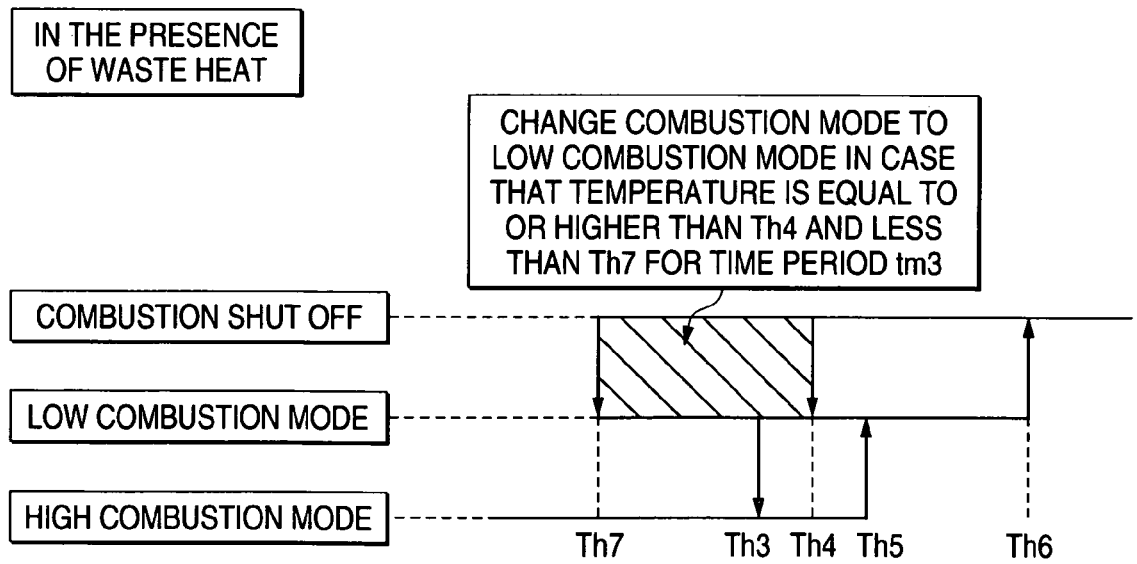
FIG. 5B is a diagram illustrating an operation of the auxiliary heating device in the case that there is exhaust heat from the exhaust heat source during a heating operation.

A second embodiment of the air conditioner, to which the invention is applied, is described hereinbelow with reference to FIG. 4 to FIG. 5B. FIG. 4 is a schematic diagram illustrating the configuration and operation of the second embodiment of the air conditioner to which the invention is applied. FIG. 5A is a diagram illustrating an operation of an auxiliary heating device in the case that there is no exhaust heat from an exhaust heat source during a heating operation. FIG. 5B is a diagram illustrating an operation of the auxiliary heating device in the case that there is exhaust heat from the exhaust heat source during a heating operation. Incidentally, constituent elements of this embodiment, which are the same as those of the first embodiment, are designated by the same reference characters used for denoting the same constituent elements of the first embodiment. Further, the description of such constituent element is omitted herein. Hereunder, constituent elements and features of the second embodiment, which differ from those of the first embodiment, are described.

The different between the air conditioners of the first and second embodiments resides in that the air conditioner of the second embodiment has no absorption chiller, and that the air conditioner of this embodiment is used only for heating. That is, an air conditioner 67 of this embodiment comprises the exhaust heat recovery unit 3, heat transfer medium pipes 69a and 69b, the auxiliary boiler 7 serving as the auxiliary heating device, the indoor unit 13, the heat transfer medium temperature sensor 15, and the control portion 19. The heat transfer medium pipes 69a and 69b are used for circulating the heat transfer medium between the exhaust heat recovery unit 3 and the indoor unit 13. The heat transfer medium, in which exhaust heat is recovered by the exhaust heat recovery unit 3, flows in the heat transfer medium pipe 69a. Conversely, the heat transfer medium discharging heat in the indoor unit 13 flows in the heat transfer medium pipe 69b. The heat transfer medium pipe 69a, in which the heat transfer medium flows, is provided with the auxiliary boiler 7, the heat transfer medium pump 23, and the heat transfer medium temperature sensor 15, which are serially provided in this order from the side of the exhaust heat recovery unit 3.

The control portion 19 is electrically connected to the three-way valve 25, the auxiliary boiler 7, the heat transfer medium pump 23, the heat transfer medium temperature sensor 15, and a control part (not shown) of the indoor unit 13 through the wires 35. Further, the control portion 19 is also electrically connected to a control part (not shown) of the engine serving as the exhaust heat source through wires (not shown), and receives information indicating whether or not the exhaust heat source is driven and operates.

In the air conditioner 1 of such a configuration of this embodiment, when there is a request to air-condition and the commencement of a heating operation is directed, the control portion 19 starts a heating operation. In the heating operation, the heat transfer medium pump 23 is operated so that the heat transfer medium circulates through the heat transfer medium pipes 69a and 69b. At that time, the control portion 19 controls the combustion in the auxiliary boiler 7 according to the temperature of the heat transfer medium, which is detected by the heat transfer medium temperature sensor 15. At that time, in the case that there is no exhaust heat, for example, the case that the exhaust heat source is stopped, the control portion 19 the combustion in the auxiliary boiler 7 within the range of the temperature of the refrigerant, which ranges from Th3 to Th6, as illustrated in FIG. 5A. Incidentally, it is assumed herein that Th3<Th4<Th5<Th6. Moreover, it is assumed that Th6<Th1<Th2.

During the heating operation startup, or when the heating load is large and the temperature of the heating medium is equal to or less than Th3, the control portion 19 drives the auxiliary boiler 7 in the high combustion mode. Then, the temperature of the heat transfer medium rises. When the temperature of the heat transfer medium detected by the heat transfer medium temperature sensor 15 reaches Th5, the control portion 19 changes the combustion mode of the auxiliary boiler 7 from the high combustion mode to the low combustion mode and thus reduces the heating value thereof. Then, the temperature of the heat transfer medium still rises. When the temperature of the heat transfer medium detected by the heat transfer medium temperature sensor 15 reaches Th6, the control portion 19 turns off the burner (not shown) of the auxiliary boiler 7 and stops the heating of the heat transfer medium. When the temperature of the heat transfer medium lowers and the temperature thereof detected by the heat transfer medium temperature sensor 15 reaches Th4, the control portion 19 turns on the burner (not shown) of the auxiliary boiler 7 and starts combustion therein in the low combustion mode and heats the heat transfer medium. Even though the heating of the heat transfer medium in the low combustion mode is performed by the auxiliary boiler 7, the temperature of the heat transfer medium drops. When the temperature of the refrigerant, which is detected by the heat transfer medium temperature sensor 15 reaches Th3, the control portion 19 changes the combustion mode of the auxiliary boiler 7 from the low combustion mode to the high combustion mode and increases the heating value thereof.

In the case that the exhaust heat source is operated, and that the heat transfer medium can be heated by exhaust heat, as shown in FIG. 5B, the control portion 19 controls the combustion in the auxiliary boiler 7 within the range of the temperature of the refrigerant, which ranges from Th3 to Th7. Incidentally, it is assumed herein that Th7<Th3<Th4<Th5<Th6. During the heating operation startup, or when the heating load is large and the temperature of the heating medium is equal to or less than Th3, the control portion 19 heats the heat transfer medium by driving the auxiliary boiler 7 in the high combustion mode. Then, the temperature of the heat transfer medium rises. When the temperature of the heat transfer medium detected by the heat transfer medium temperature sensor 15 reaches Th5, the control portion 19 changes the combustion mode of the auxiliary boiler 7 from the high combustion mode to the low combustion mode and reduces the heating value thereof. The temperature of the heat transfer medium is lowered by reducing the heating value of the auxiliary boiler 7. When the temperature f the refrigerant detected by the heat transfer medium temperature sensor 15 reaches Th3, the control portion 19 changes the combustion mode of the auxiliary boiler 7 from the low combustion mode to the high combustion mode and increases the heating value thereof. Even when the heating value of the auxiliary boiler 7 is reduced, the temperature of the heat transfer medium rises. When the temperature of the refrigerant detected by the heat transfer medium temperature sensor 15 reaches Th6, the control portion 19 turns off the burner (not shown) of the auxiliary boiler 7, so that the combustion therein is stopped, and stops the heating of the heat transfer medium.

The temperature of the heat transfer medium is lowered owing to increase in the heating load and to reduction in the amount of exhaust heat. When the temperature detected by the heat transfer medium temperature sensor 15 reaches Th4, the control portion 19 performs measurement of a time. When a condition, in which the temperature of the heat transfer medium detected by the heat transfer medium temperature sensor 15 is equal to or less than Th4, lasts for a time period tm3, that is, when the time period tm3 elapses since the temperature of the refrigerant becomes equal to or higher than Th4, the control portion 19 turns on the burner (not shown) and starts combustion therein in the low combustion mode, and heats the heat transfer medium. Alternatively, in the case that the temperature of the heat transfer medium continues to drop, when the temperature of the heat transfer medium reaches Th7, the control portion 19 turns on the burner (not shown) of the auxiliary boiler 7, regardless of the time period elapsed since the temperature of the heat transfer medium reaches Th4. Then, the control portion 19 starts combustion therein in the low combustion mode, and heats the heat transfer medium. In other words, when the temperature of the heat transfer medium reaches Th7, or in the case that a condition, in which the temperature of the heat transfer medium is equal to or higher than Th4 and less than Th7, lasts for the time period tm3, the control portion 19 turns on the burner (not shown) of the auxiliary boiler 7 and starts combustion therein in the low combustion mode, and heats the heat transfer medium.

Incidentally, the highest temperature Th6 in the range of the temperature of the heat transfer medium, which is set for performing a control operation in this embodiment, is set at a value at which the indoor unit 13 is not thermally damaged when the heat transfer medium flows into the indoor unit 13. Further, when the temperature of the heat transfer medium reaches an overtemperature Th8 (incidentally, it is assumed that Th7<Th8<Th1) being close to a temperature, at which the indoor unit 13 may be thermally damaged, the control portion 19 stops the combustion in the case that the auxiliary boiler 7 performs combustion. Moreover, as illustrated in FIG. 4, the three-way valve 25 is switched, so that a part of the heat transfer medium flowing through the heat transfer medium pipe 69a is caused to flow into the non-heat-recovery pipe 27. Thus, the recovery of exhaust heat into the heat transfer medium is stopped by the control portion 19. Consequently, the indoor unit is prevented from being thermally damaged.

Thus, according to the air conditioner 67 of this embodiment, in the case that the heat transfer medium is heated by exhaust heat outputted from the exhaust heat source, the control portion turns on the burner (not shown) of the auxiliary boiler 7 when the time period tm3 elapses since the temperature of the refrigerant becomes equal to or less than Tc4. Then, the control portion starts combustion therein in the low combustion mode. Therefore, when the amount of exhaust heat outputted from the exhaust heat source easily varies, for example, when the cooling load is small, or when the cooling load occurs intermittently, or when a valve for controlling the amount of the refrigerant flowing into the indoor unit 13 repeats opening/closing operations owing to a partial load, the amount of exhaust heat supplied from the exhaust heat source varies by repeating increase/decrease thereof. Thus, even when the temperature of the refrigerant temporarily rises in spite of the fact that the temperature of the refrigerant is generally liable to drop or to be unchanged, the auxiliary boiler 7 is restrained from starting combustion therein. Moreover, the heating value of the auxiliary boiler 7 is prevented from increasing. Thus, the energy consumption of the auxiliary boiler 7 is limited. Consequently, the energy-saving capability of the air conditioner can be enhanced.

Furthermore, in the case of the air conditioner 1 of this embodiment, independently of the duration of the condition, in which the temperature of the refrigerant is equal to or less than Th4, the auxiliary boiler 7 is operated when the temperature of the refrigerant reaches a temperature being close to a temperature at which the sufficient heating performance of the indoor unit 13 cannot be obtained, that is, when the temperature of the heat transfer medium reaches Th7. Thus, the temperature of the heat transfer medium can be prevented from falling to a temperature at which the sufficient heating performance of the indoor unit 13 cannot be obtained. Consequently, this embodiment is preferable, because the comfort of the air conditioner is not lost.

Additionally, in the foregoing description of this embodiment, the configuration of the air conditioner, in which combustion in the auxiliary boiler 7 is started when a condition, in which the temperature of the heat transfer medium is equal to or less than the predetermined temperature, lasts for the predetermined time period has been described. However, the air conditioner of this embodiment may have a configuration in which the heating value of the auxiliary boiler 7 is increased when a condition, in which the temperature of the heat transfer medium is equal to or less than the predetermined temperature during the heating operation, lasts for the predetermined time period. Alternatively, the air conditioner of the invention may employ the combination of such configurations.

THIRD EMBODIMENT

Figure 6:
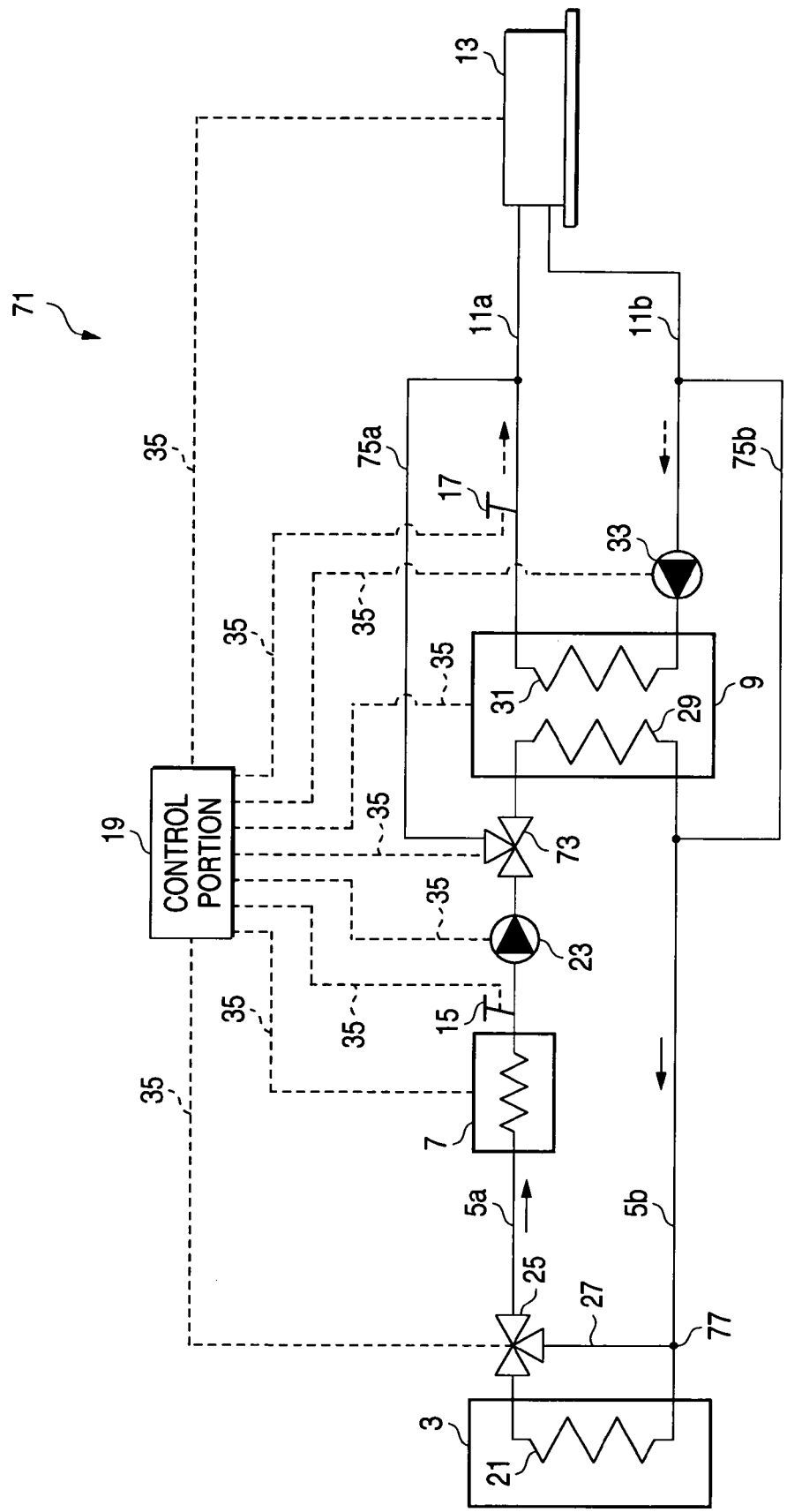
FIG. 6 is a schematic diagram illustrating the configuration and operation of a third embodiment of the air conditioner to which the invention is applied.

A third embodiment of the air conditioner, to which the invention is applied, is described hereinbelow with reference to FIG. 6. FIG. 6 is a schematic diagram illustrating the configuration and operation of the third embodiment of the air conditioner to which the invention is applied. Incidentally, constituent elements of this embodiment, which are the same as those of the first and second embodiments, are designated by the same reference characters used for denoting the same constituent elements of the first and second embodiments. Further, the description of such constituent element is omitted herein. Hereunder, constituent elements and features of the third embodiment, which differ from those of the first and second embodiments, are described.

The third embodiment differs from the first and second embodiments in that the air conditioner 1 of the first embodiment is designed specifically for cooling, and the air conditioner 67 of the second embodiment is designed specifically for heating, while the air conditioner of the third embodiment is designed for performing both the cooling and the heating. That is, the air conditioner 71 of this embodiment comprises the exhaust heat recovery unit 3, the heat transfer medium pipes 5a, 5b, the auxiliary boiler 7 serving as the auxiliary heating device, the absorption chiller 9, the refrigerant pipes 11a, 11b, the indoor unit 13, the heat transfer medium temperature sensor 15, the refrigerant temperature sensor 17, the control portion 19, a cooling/heating switch three-way valve 73, and bypass pipes 75a and 75b.

The cooling/heating switch three-way valve 73 is provided at a part located at the downstream side of a flow of the heat transfer medium from the heat transfer medium pump 23 of the heat transfer medium pipe 5a. The bypass pipe 75a is connected to the cooling/heating switch three-way valve 73 at an end thereof, and also joined to a part located at the downstream side of a flow of the refrigerant from the refrigerant temperature sensor 17 of the refrigerant pipe 11a at the other end thereof. The bypass pipe 75b branches off at an end thereof from the refrigerant pipe 11b at a part located at the downstream side of a flow of the refrigerant of the refrigerant pipe 11b, and joins to a part located at the upstream side of a flow of the heat transfer medium from a junction portion 77 between the heat transfer medium pipe 5b and the non-heat-recovery pipe 27. Therefore, during a heating operation, a heat transfer medium flows through the bypass pipe 75a toward the indoor unit 13. Moreover, the heat transfer medium having discharged heat in the indoor unit 13 flows through the bypass pipe 75b toward the exhaust heat recovery unit 3.

The control portion 19 is electrically connected to the three-way valve 25, the auxiliary boiler 7, the heat transfer medium temperature sensor 15, the heat transfer medium pump 23, the cooling/heating switch three-way valve 73, pumps (not shown) of the absorption chiller 9, cooling fans of a cooling tower (not shown), the refrigerant temperature sensor 17, the refrigerant pump 33, and a control part (not shown) of the indoor unit 13 through the wires 35.

In the air conditioner 71 of such a configuration of this embodiment, when there is a request to air-condition and the a cooling operation is selected by using an operation changing switch (not shown), the control portion 19 switches the cooling/heating switch three-way valve 73 so that the heat transfer medium and the cooling water circulate through the absorption chiller 9, the heat transfer medium pipes 5a, 5b, and the cooling/heating water pipes 11a, 11b. Then, the control portion 19 operates the heat transfer medium pump 23 provided in the heat transfer medium pipe 5a, the refrigerant pump 33 provided in the refrigerant pipe 11b, the cooling fan of the cooling tower (not shown) of the absorption chiller 9, and pumps each for circulating cooling water and adsorbent. Thus, the absorption chiller 9 is driven by heat of the heat transfer medium flowing through the heat transfer medium pipe 5a, and performs the cooling of the refrigerant circulating through the refrigerant pipes 11a, 11b. A cool current of air is sent from the indoor unit 13 by causing the refrigerant cooled by this absorption chiller 9 to flow through the refrigerant pipes 11a, 11b. Thus, the cooling operation is performed.

On the other hand, when there is a request to air-condition and the a heating operation is selected by using an operation changing switch (not shown), the control portion 19 switches the cooling/heating switch three-way valve 73 so that the heat transfer medium flowing through the heat transfer medium pipe 5a is caused to flow from the refrigerant pipe 11a to the indoor unit 13 through the bypass pipe 75a. Then, the control portion 19 operates the heat transfer medium pump 23 provided in the heat transfer medium pipe 5a and puts the refrigerant pump 33 provided in the refrigerant pipe 11b in to a stopped state. Thus, the heat transfer medium is not supplied to the absorption chiller 9 and circulates between the exhaust heat recovery unit 3 and the indoor unit 13 through the bypass pipes 75a and 75b for bypassing the absorption chiller 9. A warm current of air is blown out from the indoor unit 13 by causing the heat transfer medium to flow through the indoor unit 13. Thus, the heating operation is performed. Incidentally, the control portion 19 performs control operations, which are the same as those of the control portions of the first and second embodiment, other than a control process of switching the cooling/heating switch three-way valve 73. Further, during a cooling operation, the control operation 19 of the third embodiment performs a control operation similar to that to be performed in the first embodiment during a cooling operation. Moreover, during a heating operation, the control operation 19 of the third embodiment performs a control operation similar to that to be performed in the second embodiment during a heating operation.

Thus, in the case of the air conditioner 71 of the third embodiment, the cooling/heating switch three-way valve 73 is switch so that the heat transfer medium flows through the bypass pipes 75a and 75b during a heating operation. Thus, the heating operation can be performed by supplying the heat transfer medium directly to the indoor unit 13. Consequently, both a cooling operation and a heating operation can be performed by a single air conditioner. Moreover, the energy saving capability of the air conditioner can be enhanced.

Further, in the foregoing description of the first, second and third embodiments, it has been described that during a cooling operation, what is called a three-stage three-position or four-position control action is performed, and that during a heating operation, what is called a three-stage four-position or five-position control action is performed. However, a control action according to the invention is not limited thereto. The invention can be applied to various multi-stage multi-position control actions and proportional control actions.

Furthermore, the effect of enhancing the energy-saving capability can be obtained by singly using each of the configurations described in the foregoing description of the first and third embodiments, that is, the configuration, in which an operation of the auxiliary boiler 7 is controlled according to the temperature of the heat transfer medium during a cooling startup operation and in which an operation of the auxiliary boiler 7 is controlled according to the temperature of the refrigerant during a cooling stationary operation, the configuration in which the startup of combustion in the auxiliary boiler 7 or the heating value thereof is performed when a condition, in which the temperature of the refrigerant is equal to or higher than the predetermined temperature, lasts for a predetermined time period during a cooling stationary operation, and the configuration in which the startup of combustion in the auxiliary boiler 7 or the heating value thereof is performed when a condition, in which the temperature of the heat transfer medium is equal to or lower than the predetermined temperature, lasts for a predetermined time period during a heating stationary operation. Incidentally, when the combination of such configurations is used, the energy-saving capability of the air conditioner can be enhanced still more.

Further, although the three-way valve 25 and the non-heat-recovery pipe 27 are used as a heat transfer medium overtemperature protection mechanism for preventing an occurrence of overheat of the heat transfer medium in the first, second and third embodiments, for example, a configuration, in which the exhaust heat recovery unit 3 may be selectively operated in a heat recovery mode and a non-heat-recovery mode, may be used as that of the heat transfer medium overtemperature protection mechanism. For instance, an exhaust heat recovery unit having a passage switching mechanism adapted to switch a flowing mode between a mode, in which exhaust gas outputted from an exhaust heat source is caused to flow in a passage provided with the heat exchange portion 21 of the exhaust heat recovery unit 3, and another mode, in which the exhaust gas is caused to flow directly into the exhaust gas passage of the exhaust heat recovery unit 3 without allowing the exhaust gas outputted from the exhaust heat source to flow into the passage provided with the heat exchange portion 21, may be used as the exhaust heat recovery unit of such a configuration.

Furthermore, in the foregoing description of the first, second, and third embodiments, an internal-combustion engine is exemplified as the exhaust heat source. The invention, however, may be applied to various air conditioners utilizing exhaust heat outputted from various exhaust heat sources, for example, fuel cells, industrial exhaust heat sources, geothermal sources, and hot springs. Moreover, the exhaust heat is not limited to the heat of exhaust gas. Exhaust heat can be recovered from cooling water for an internal combustion engine. Additionally, the invention is not limited to the air conditioners of the configurations described in the description of the first, second and third embodiments. The invention can be applied to air conditioners of various configurations, as long as such air conditioners are those for performing heating by using exhaust heat, those for performing cooling of refrigerants by absorption chillers driven by exhaust heat, and those provided with features of both of such air conditioners respectively designed specifically for cooling and heating and adapted to perform both the cooling and the heating, and have auxiliary heating devices, such as a heater and a burner.

INDUSTRIAL APPLICABILITY

According to the invention, the energy-saving capability of an air conditioner can be enhanced.

The invention claimed is:

1. An air conditioner by comprising:
   an exhaust heat recovery unit for recovering exhaust heat in a heat transfer medium;
   a heat transfer medium passage in which said heat transfer medium outputted from said exhaust heat recovery unit flows;
   an auxiliary heating device, provided in said heat transfer medium passage, for heating said heat transfer medium;
   an absorption chiller, to which said heat transfer medium passage is connected, to be driven by heat of said heat transfer medium;
   a refrigerant passage, through which a refrigerant outputted from said absorption chiller flows;
   an indoor unit to which said refrigerant is supplied through said refrigerant passage;
   a heat transfer medium temperature detecting means for detecting a temperature of said heat transfer medium flowing through said heat transfer medium passage;
   a refrigerant temperature detecting means for detecting a temperature of said refrigerant flowing through said refrigerant passage; and
   a control portion for controlling an operation of driving said auxiliary heating device,
   wherein on startup, said control portion controls an operation of driving said auxiliary heating device according to the temperature of said heat transfer medium on startup, which is detected by said heat transfer medium temperature detecting means,
   wherein when the temperature of said refrigerant, which is detected by said refrigerant temperature detecting means, is equal to or lower than a predetermined temperature, said control portion decides that a startup operation is completed, and
   wherein upon completion of the startup operation, said control portion controls an operation of driving said auxiliary heating device according to the temperature of said refrigerant, which is detected by said refrigerant temperature detecting means.

2. An air conditioner comprising:
   an exhaust heat recovery unit for recovering exhaust heat in a heat transfer medium;
   a heat transfer medium passage in which said heat transfer medium outputted from said exhaust heat recovery unit flows;
   an auxiliary heating device, provided in said heat transfer medium passage, for heating the heat transfer medium;
   an absorption chiller, to which said heat transfer medium passage is connected, to be driven by heat of said heat transfer medium;
   a refrigerant passage, through which a refrigerant outputted from said absorption chiller flows;
   an indoor unit to which said refrigerant is supplied through said refrigerant passage;
   a heat transfer medium temperature detecting means for detecting a temperature of said heat transfer medium flowing through said heat transfer medium passage;
   a refrigerant temperature detecting means for detecting a temperature of said refrigerant flowing through said refrigerant passage; and
   a control portion for controlling an operation of driving said auxiliary heating device,
   wherein said control portion controls an operation of driving said auxiliary heating device according to the temperature of said refrigerant, which is detected by said refrigerant temperature detecting means, and
   wherein during a state in which said heat transfer medium is heated by exhaust heat, said control portion drives said auxiliary heating device or increases a heating value of said auxiliary heating device in a case that a condition, in which the temperature of said refrigerant detected by said refrigerant temperature detecting means is equal to or higher than a predetermined temperature, lasts for a predetermined time period.

3. An air conditioner, characterized by comprising:
   an exhaust heat recovery unit for recovering exhaust heat in a heat transfer medium;
   a heat transfer medium passage in which said heat transfer medium outputted from said exhaust heat recovery unit flows;

an auxiliary heating device, provided in said heat transfer medium passage, for heating the heat transfer medium;

an absorption chiller, to which said heat transfer medium passage is connected, to be driven by heat of said heat transfer medium;

a refrigerant passage, through which a refrigerant outputted from said absorption chiller flows;

an indoor unit to which said refrigerant is supplied through said refrigerant passage;

a heat transfer medium temperature detecting means for detecting a temperature of said heat transfer medium flowing through said heat transfer medium passage;

a refrigerant temperature detecting means for detecting a temperature of said refrigerant flowing through said refrigerant passage; and a control portion for controlling an operation of driving said auxiliary heating device, wherein said control portion controls an operation of driving said auxiliary heating device according to the temperature of said heat transfer medium, which is detected by said heat transfer medium temperature detecting means, wherein during a state in which said heat transfer medium is heated by exhaust heat, said control portion drives said auxiliary heating device or increases a heating value of said auxiliary heating device in a case that a condition, in which the temperature of said heat transfer medium detected by said refrigerant temperature detecting means is equal to or lower than a predetermined temperature, lasts for a predetermined time period.

4. An air conditioner, characterized by comprising:

an exhaust heat recovery unit for recovering exhaust heat in a heat transfer medium;

a heat transfer medium passage in which said heat transfer medium outputted from said exhaust heat recovery unit flows;

an auxiliary heating device, provided in said heat transfer medium passage, for heating said heat transfer medium;

an absorption chiller, to which said heat transfer medium passage is connected, to be driven by heat of said heat transfer medium;

a refrigerant passage, through which a refrigerant outputted from said absorption chiller flows;

an indoor unit to which said refrigerant is supplied through said refrigerant passage;

a heat transfer medium temperature detecting means for detecting a temperature of said heat transfer medium flowing through said heat transfer medium passage;

a refrigerant temperature detecting means for detecting a temperature of said refrigerant flowing through said refrigerant passage; and a control portion for controlling an operation of driving said auxiliary heating device, wherein on startup of a cooling operation, said control portion controls an operation of driving said auxiliary heating device according to the temperature of said heat transfer medium, which is detected by said heat transfer medium temperature detecting means, wherein when the temperature of said refrigerant, which is detected by said refrigerant temperature detecting means, is equal to or lower than a first temperature, said control portion decides that the startup of a cooling operation is completed, wherein upon completion of the startup of the cooling operation, said control portion controls an operation of driving said auxiliary heating device according to the temperature of said refrigerant, which is detected by said refrigerant temperature detecting means, and wherein during a state in which said heat transfer medium is heated by exhaust heat, said control portion drives said auxiliary heating device or increases a heating value of said auxiliary heating device in a case that the temperature of said heat transfer medium detected by said refrigerant temperature detecting means is equal to or lower than a second temperature, which is higher than the first temperature, and that a condition, in which the temperature of said heat transfer medium detected by said refrigerant temperature detecting means is equal to or lower than the second temperature, lasts for a predetermined time period.

5. An air conditioner comprising:

an exhaust heat recovery unit for recovering exhaust heat in a heat transfer medium;

a heat transfer medium passage in which said heat transfer medium outputted from said exhaust heat recovery unit flows;

an auxiliary heating device, provided in said heat transfer medium passage, for heating said heat transfer medium;

an absorption chiller, to which said heat transfer medium passage is connected, to be driven by heat of said heat transfer medium;

a refrigerant passage, through which a refrigerant outputted from said absorption chiller flows;

a valve provided with the heat transfer medium passage;

a bypass passage branching off the valve;

an indoor unit to which said refrigerant is supplied through said refrigerant passage;

a heat transfer medium temperature detecting means for detecting a temperature of said heat transfer medium flowing through said heat transfer medium passage;

a refrigerant temperature detecting means for detecting a temperature of said refrigerant flowing through said refrigerant passage; and a control portion for controlling an operation of driving said auxiliary heating device, wherein during a cooling operation, said control portion controls an operation of driving said auxiliary heating device according to the temperature of said refrigerant, which is detected by said refrigerant temperature detecting means, wherein during a state in which said heat transfer medium is heated by exhaust heat, said control portion drives said auxiliary heating device or increases a heating value of said auxiliary heating device in a case that the temperature of said refrigerant detected by said refrigerant temperature detecting means is equal to or lower than a first temperature, and that a condition, in which the temperature of said refrigerant detected by said refrigerant temperature detecting means is equal to or lower than the first temperature, lasts for a first time period;

wherein during a heating operation, said control portion controls an operation of driving said auxiliary heating device according to the temperature of said heat transfer medium, which is detected by said heat transfer medium temperature detecting means;

wherein during a state in which said heat transfer medium is heated by exhaust heat, said control portion drives said auxiliary heating device or increases a heating value of said auxiliary heating device in a case that the temperature of said heat transfer medium detected by said heat transfer medium temperature detecting means is equal to or lower than a second temperature, which is higher than the first temperature, and that a condition, in which the temperature of said heat transfer medium detected by said refrigerant temperature detecting means is equal to or lower than the second temperature, lasts for a second time period.

* * * * *